(12) United States Patent
Huang et al.

(10) Patent No.: US 9,478,005 B2
(45) Date of Patent: Oct. 25, 2016

(54) METHOD AND DEVICE FOR PROCESSING 2D GRAPHICS

(71) Applicant: Montage Technology (Shanghai) Co., Ltd., Shanghai (CN)

(72) Inventors: Xiaodong Huang, Shanghai (CN); Chengmei Zhou, Shanghai (CN)

(73) Assignee: MONTAGE TECHNOLOGY (SHANGHAI) CO., LTD., Shanghai (CN)

( * ) Notice: Subject to any disclaimer, the term of this patent is extended or adjusted under 35 U.S.C. 154(b) by 86 days.

(21) Appl. No.: 14/295,362

(22) Filed: Jun. 4, 2014

(65) Prior Publication Data

US 2015/0302548 A1    Oct. 22, 2015

(30) Foreign Application Priority Data

Apr. 21, 2014    (CN) .......................... 2014 1 0160716

(51) Int. Cl.
| | |
|---|---|
| G09G 5/00 | (2006.01) |
| G06T 3/00 | (2006.01) |
| G06T 3/60 | (2006.01) |
| G06T 3/40 | (2006.01) |
| G06T 15/20 | (2011.01) |

(52) U.S. Cl.
CPC .............. *G06T 3/0006* (2013.01); *G06T 3/00* (2013.01); *G06T 3/4007* (2013.01); *G06T 3/60* (2013.01); *G06T 15/205* (2013.01)

(58) Field of Classification Search
CPC ...... G06F 13/16; G06J 1/00; G02F 1/13318; G03F 9/7049; G06T 15/04; G06T 15/205; G06T 15/40
USPC ........................................................ 345/658
See application file for complete search history.

(56) References Cited

PUBLICATIONS

Donald Hearn, M. Pauline Baker, "Computer Graphics with OpenGL (Third Edition)," Pearson Prentice Hall, 2004, U.S.A. pp. 373-374.

*Primary Examiner* — Gregory J Tryder
*Assistant Examiner* — Kwang Lee
(74) *Attorney, Agent, or Firm* — Perkins Coie LLP

(57) ABSTRACT

A method of processing 2D graphics comprising generating a perspective projection of a 2D graphics by scaling the 2D graphics with a variable ratio, wherein scaling the 2D graphics with the variable ratio comprises interpolating the graphics with a filter, such that a point $x_p$ in the perspective projection is generated from a point $x_0$ in the 2D graphics with a following equation $x_0 = 1/R(j) \ast x_p + Ph(j)$, wherein j represents a line index of the point $x_0$, $1/R(j)$ represents a scaling factor of a length in the 2D graphics versus a length in the perspective projection, and $Ph(j)$ represents a phase shift.

26 Claims, 15 Drawing Sheets

METHOD AND DEVICE FOR PROCESSING 2D GRAPHICS

CLAIM OF PRIORITY

This application claims priority to chinese application no. 201410160716.8 entitled "method and device for processing 2d graphics", filed on Apr. 21, 2014 by Montage Technology (Shanghai) Co., Ltd., which is incorporated herein by reference.

TECHNICAL FIELD

The present disclosure relates to graphics processing, and more particularly, but not exclusively to a method and device for processing 2D graphics.

BACKGROUND

In some graphics applications, 2D graphics need to be rendered in 3D for displaying a user interface (UI). Conventionally, 2D graphics can be rendered as a 3D graphics by performing a coordinate transform based on point-to-point 3D perspective projection using the following equation Ph=Mpers*Mw2v*Mm2w*P. Wherein P is a point in the 2D graphics, Mm2w is a transform matrix from modeling coordinates to world coordinates, and Mw2v is a transform matrix from the world coordinates to the viewing coordinates. Mpers represents a perspective matrix, and Ph represents a perspective coordinate. However, the above algorithm cannot output graphics data continuously. Further anti-aliasing filter is hard to be combined to the algorithm to improve output graphics quality, and it is hard to be implemented by hardware. Therefore, it is desirable to have an easier way of processing 2D graphics to generate 3D graphics.

SUMMARY OF THE INVENTION

In an embodiment, a method comprises generating a perspective projection of a 2D graphics by scaling the 2D graphics with a variable ratio, wherein scaling the 2D graphics with the variable ratio comprises interpolating the graphics with a filter, such that a point $x_p$ in the perspective projection is generated from a point $x_0$ in the 2D graphics with a following equation $x_0=1/R(j)*x_p+Ph(j)$, wherein j represents a line index of the point $x_0$, $1/R(j)$ represents a scaling factor of a length in the 2D graphics versus a length in the perspective projection, and $Ph(j)$ represents a phase shift.

In another embodiment, a device comprises a scaling module, configured to generate a perspective projection of a 2D graphics by scaling the 2D graphics with a variable ratio, wherein the scaling module further comprises a filter configured to interpolate the graphics, such that a point $x_p$ in the perspective projection is generated from a point $x_0$ in the 2D graphics with a following equation $x_0=1/R(j)*x_p+Ph(j)$, wherein j represents a line index of the point $x_0$, $1/R(j)$ represents a scaling factor of a length in the 2D graphics versus a length in the perspective projection, and $Ph(j)$ represents a phase shift.

BRIEF DESCRIPTION OF THE DRAWINGS

The present invention is illustrated in an exemplary manner by the accompanying drawings. The drawings should be understood as exemplary rather than limiting, as the scope of the invention is defined by the claims. In the drawings, like references indicate similar elements.

DETAILED DESCRIPTION

Various aspects and examples of the invention will now be described. The following description provides specific details for a thorough understanding and enabling description of these examples. Those skilled in the art will understand, however, that the invention may be practiced without many of these details.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

In general, several different Cartesian reference frames are used to construct and display a scene. Shape of individual objects can be constructed, such as trees or furniture, in a scene within separate coordinate reference frames called modeling coordinates. Once individual object shapes have been specified, the objects are placed into appropriate positions within the scene using a reference frame called world coordinates. In addition, a particular view for a scene can be chosen by establishing the viewing coordinate system, also called the view reference coordinate system. The viewing coordinate system includes a viewport plane. The viewport can be a human's eye or a camera. In the following description, the world coordinates are omitted for simplifying the description.

The term "perspective projection" in an embodiment means an approximate representation, on a flat surface (such as paper), of an image as it is seen by the eye. Perspective projection includes two characters: smaller as their distance from the observer increases; and the size of an object's dimensions along the line of sight are relatively shorter than dimensions across the line of sight.

Figure 1:
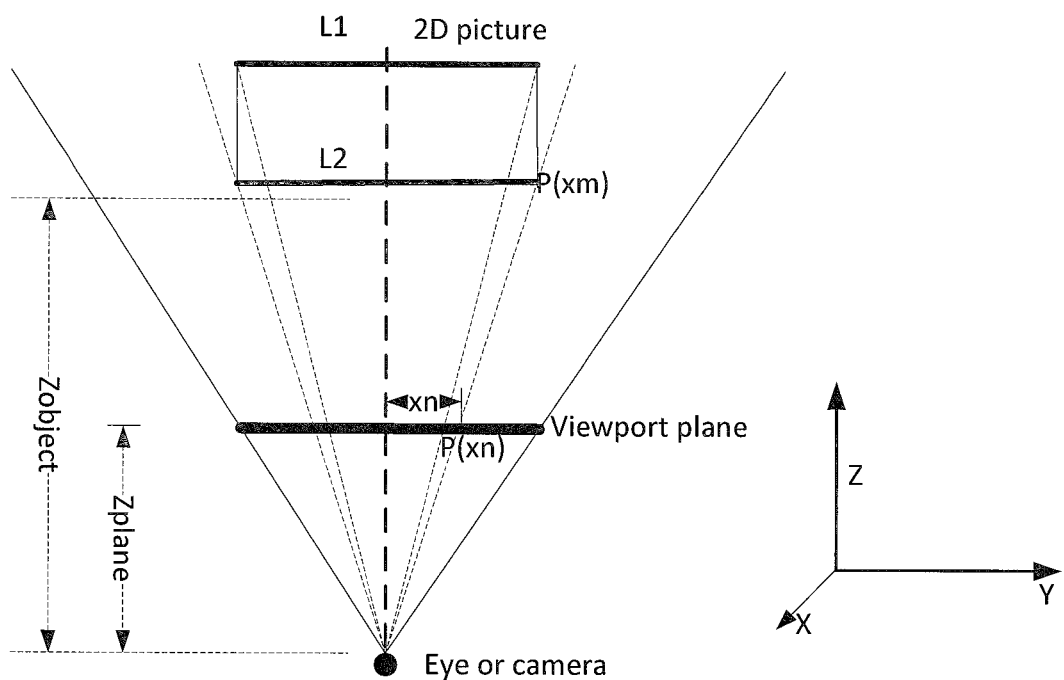
FIG. 1 is a diagram illustrating a principle for projection of 2D graphics by a variable ratio scaling. $P(x_m)$ is a point in the modeling coordinate.

FIG. 1 is a diagram illustrating a principle for projection of 2D graphics by a non-linear transformation. $P(x_m)$ is a point in the modeling coordinate. $P(x_n)$ is a point in the viewport plane. $x_n$ is a distance of a point $P(x_n)$ to the central axis of the viewport plane. $P(x_n)$ is a projection of the point $P(x_m)$ in the viewport plane. From FIG. 1, it is clear that the farther the graphics are away from the eye or camera, the smaller the projection of the graphics. For example, L1 is farther away from the eye or camera than L2; therefore L1 appears to shrink more than L2. Zobject is the distance between object (image) and eye or camera at Z direction; Zplane is the distance of view plane and eye or camera at Z direction.

Figure 2A:
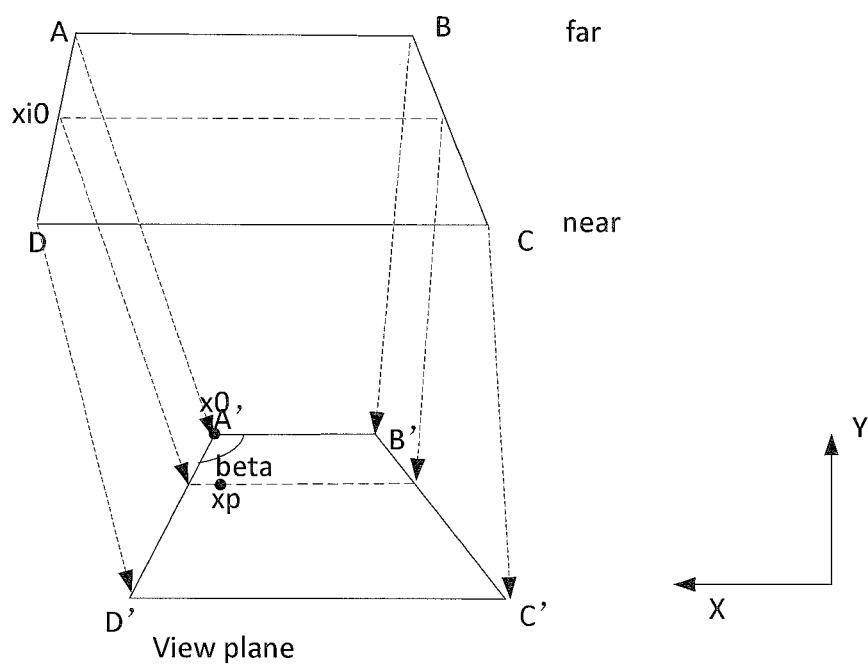
FIG. 2A is a diagram illustrating an embodiment of transformation of a point from the modeling coordinate to a view plane coordinate.

FIG. 2A is diagram illustrating transformation of a point from the modeling coordinate to a view plane coordinate. From FIG. 2A, it can be seen that a quadrilateral ABCD can be transformed into another quadrilateral. In an embodiment, both of the quadrilaterals include trapezoids, wherein AB is parallel to CD, and A'B' is parallel to C'D'. AB is the upmost line of the 2D graphics, and CD is the lowermost line of the 2D graphics, and A'B' is a projection of AB, and C'D' is a projection of CD. The projection can be generated using the relationship between the modeling coordinate and the view plane coordinate. First the following expressions are defined:

A scaling ratio of AB to A'B' is R0=A'B'/AB;
A scaling ratio of CD to C'D' is R1=C'D'/CD; and
An angle between line A'B' and line A'D' is beta.

The projection A'B'C'D' of the graphics ABCD can be obtained by resampling in the X direction from line A'B' in a N lines by N lines sequence.

A scaling ratio of each line can be represented as R(j), which equals R0+j*(R1−R0)/Height, P(j) represents a start location in line j. Height refers to a height of the quadrilateral ABCD. Note that as in this embodiment, there is no scaling in y direction, the height of the quadrilateral ABCD equals the height of the quadrilateral A'B'C'D'.

Further, FIG. 2A shows an point $x_0$, which is a starting location of A'B', $x_p$ which is a current calculated point, and xi0, which is in graphics ABCD and represents a starting point in each line of the graphics ABCD.

Figure 2B:
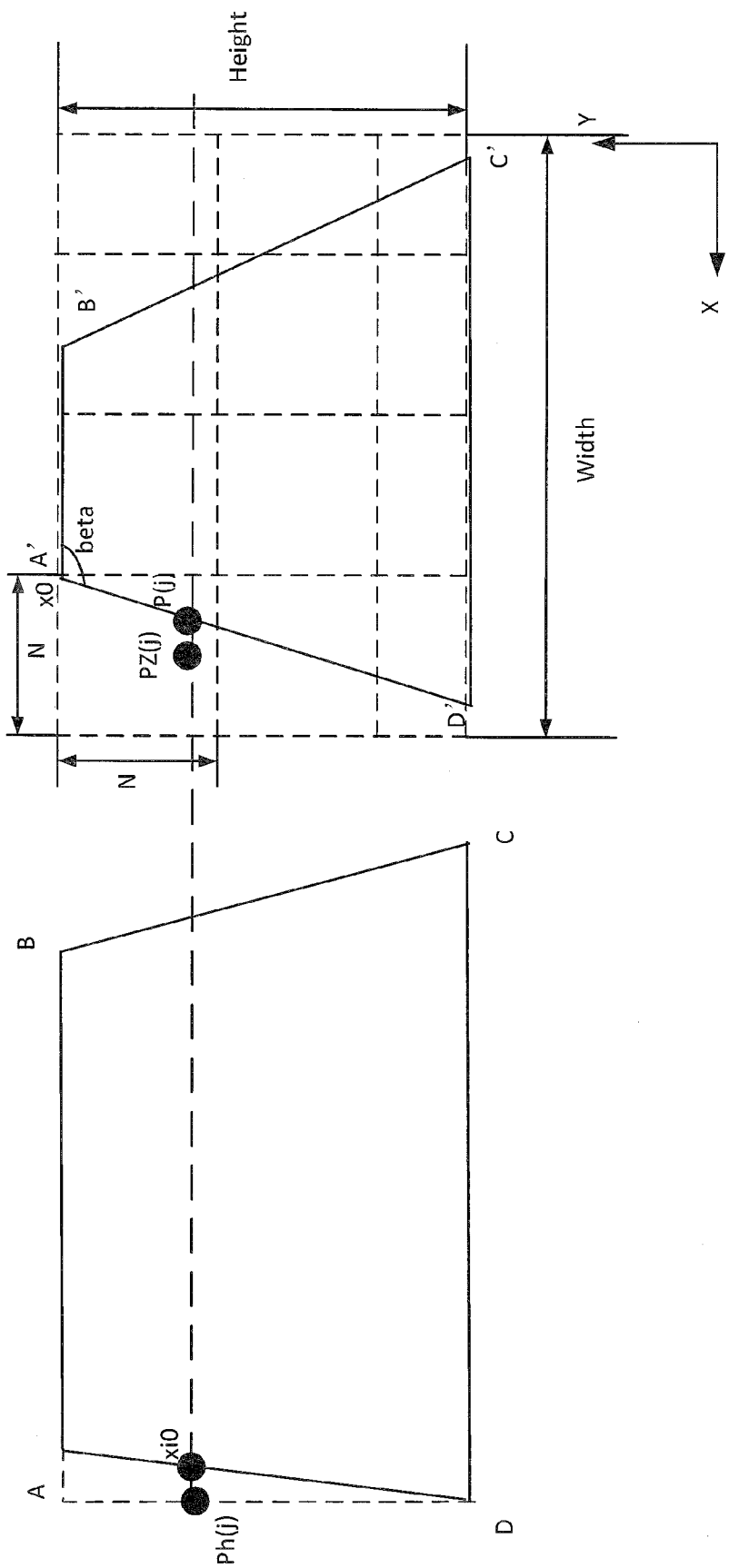
FIG. 2B is another diagram illustrating another embodiment of transformation of a point from the modeling coordinate to a view plane coordinate.

FIG. 2B is another diagram illustrating transformation of a point from the modeling coordinate to a view plane coordinate. Referring to FIG. 2B, a starting position of each line can be represented as P(j)=x0+j*c tan(beta), wherein x0 represents a starting location of A'B', or in other words, the leftmost point of A'B', which is the point represented by A'. Further, as the raster in the view plane coordinate is discrete, that means, points can only appear in integer points in the view plane raster, or in other words, intersection of two crossing raster lines, therefore, the actual start point of each line should be PZ(j), which is an integer approximation of P(j). PZ(j) represents a point on the graphics A'B'C'D'. Note that in FIG. 2B, an N×N raster block is shown in dotted lines. Those having ordinary skill in the art should understand that a N×N raster block includes N rows and N columns of raster lines. In order to better show the points and coordinates related to embodiments of invention, not all raster lines are shown in FIG. 2B. PZ(j) can be generated by round P(j). Alternatively, PZ(j) can be generated by ceiling P(j). Ceiling P(j) in an embodiment means to obtain the minimum integer which is larger than or equal to P(j). Alternatively, PZ(j) can be generated by flooring P(j). Flooring P(j) in an embodiment means to obtain the maximum integer which is less than or equal to P(j). Note that the block may contain less than N rows and/or less than N columns, such as the blocks shown in FIG. 2B in the lowest or rightmost in the right part graphics.

As a result, the decimal part can be represented as PD(j)=P(j)−PZ(j). Therefore, in order to obtain an actual start point PZ(j), a point in the 2D graphics ABCD should also be shifted. In other words, the decimal part PD(j) in the viewing plane coordinates is also mapped to modeling coordinates. Accordingly a phase offset Ph(j)=−PD(j)/R(j) can be applied to the points $x_0$ in the 2D graphics ABCD to compensate for the offset.

Then N lines of points in the 2D graphics ABCD are inputted, and then the computation result is outputted in N parallel lines, until all the lines have been computed, which is shown in the following computation.

The computation can be represented as

```
For j=1:N:Height
{
    For k=1:N
    {
        xi(k) = Xi0+Ph(j);
    }
    For i=1:Width
    {
        For k=1:N
        {
            If(xi(k)<PZ(j))
                B(i,j+k−1) = PIXEL_MASK;
            else
            {
                B(i,j+k−1) = AX(xi(k),j+k−1);
                xi(k) = xi(k)+1/R(j);
            }
        }
    }
}
```

Wherein, B(i,j+k−1) represents graphics on the view plane coordinates. Width represents the width of graphics in the view plane. Xi(k) is a point on the graphics ABCD.

Further, each point in the output graphics corresponds to its own PIXEL_MASK, which in an embodiment represents that the pixel is void. That means, the output data is blocked or masked on the storage bus. PIXEL_MASK needs to be outputted to memory. Therefore a dedicated or shared memory may be used to store the PIXEL_MASK information.

Alternatively, assigning PIXEL_MASK to the pixel of graphics can also be achieved by changing alpha value of the pixel. Alpha compositing is the process of combining an image with a background to create the appearance of partial or full transparency. An alpha value of 0 means that the pixel does not have any coverage information and is transparent; i.e. there was no color contribution from any geometry because the geometry did not overlap this pixel. An alpha value of 1 means that the pixel is opaque because the geometry completely overlapped the pixel. When the graphics overlapping technique with alpha value is used to process the input graphics, set the alpha value of the pixel to 0 has the same effect as assign a PIXEL_MASK to the pixel, as the pixel with an alpha value of 0 is transparent, in other words, invisible. Alpha value is already within the color information such as aRGB, aYUV, and does not need to be input additionally.

Referring back to the above computation, wherein N is a power of 2, such as 4, 8, 16.

Xi0 is an initial phase of the input graphics, i.e., the boundary of the graphics A(m, n) in the x direction.

AX(x, y) is a plane graphics corresponding to the A(m, n). A (m, n) comprises digitalized points, which are discrete. The value of AX(x, y) can be generated by interpolating values into A(m, n). In this embodiment, the interpolation is carried out in the X direction. AX(x, y) can be obtained from the following equation:

$$AX(xi(k), y) = \sum_u F(u, y) \times A(u, y)$$

In an embodiment, when F(u,y) does not vary with the change of sampling point or output lines, F(u, y) equals F(u), which means F(u,y) does not change in the y direction. F(u) can be an interpolation filter. To be more specific, F(u) can be an interpolation filter with finite length, therefore u is an integer within a scope related to the length of the filter. The interpolation filter can be a cubic filter, a linear interpolation filter, a Sinc filter, or any kinds of filter that can carry out an interpolation operation.

Alternatively, the interpolation filter is a variable filter dependent on a horizontal location of the pixel, or the location of the point within the 2D graphics. In other words, the interpolation filter varies with the increase of interpolated point. The advantage of using the variable interpolation filter is that: since the resampling frequency for different horizontal location is variable, in other words, points with different horizontal coordinates within the 2D graphics are scaled with different scaling ratio, using variable interpolation filters for different resampling frequency improves frequency response for resampling, and improves the quality of output graphics.

Figure 3:
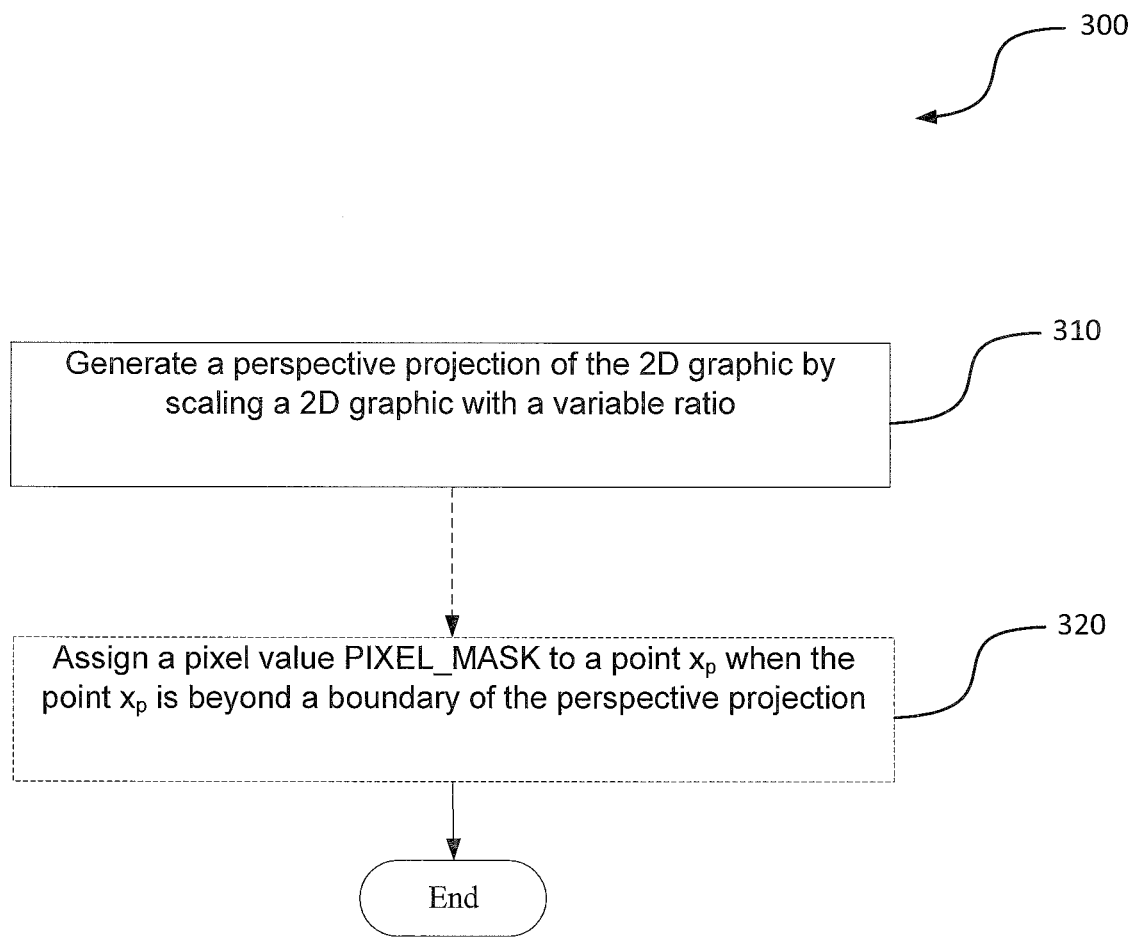
FIG. 3 is a flow chart illustrating an embodiment of a method.

FIG. 3 is a flow chart illustrating an embodiment of a method. In FIG. 3, the method 300 comprises generating (in block 310) a perspective projection of the 2D graphics by scaling a 2D graphics with a variable ratio. Scaling the 2D graphics with the variable ratio comprises interpolating the graphics with a filter, such that a point $x_p$ in the perspective projection is generated from a point $x_0$ in the 2D graphics with a following equation $x_0=1/R(j)*x_p+Ph(j)$, wherein j represents a line index of the point $x_0$, 1/R(j) represents a scaling factor of a length in the 2D graphics versus a length in the perspective projection, and Ph(j) represents a phase shift. $X_p$ represents a currently calculated point.

Alternatively, Ph(j) compensates for a phase offset in a modeling coordinate where the point $x_0$ is located.

To be more specific, Ph(j)=−PD(j)/R(j), PD(j)=P(j)−PZ(j), PZ(j)=Round(P(j)), R(j) equals R0+j*(R1−R0)/Height, $R_0$=A'B'/AB, $R_1$=C'D'/CD, wherein AB and CD represent the lengths in the 2D graphics, AB is the upmost line of the 2D graphics, and CD is the lowermost line of the 2D graphics, and A'B' and C'D' represent the lengths that AB and CD respectively project in the perspective projection, Height represents a height of the 2D graphics, P(j) represents a start location of $x_p$ in line j, PZ(j) represents an integer approximation of P(j).

The method 300 further comprises assigning (in block 320) a pixel value PIXEL_MASK to a point $x_p$ when the point $x_p$ is beyond a boundary of the perspective projection. Note that block 320 is dotted since it is optional and can be omitted.

An embodiment method achieves a 3D perspective graphics display effect by scaling a 2D graphics with variable ratio. Alternatively or additionally, the method further includes performing transformation on the 2D graphics. Alternatively or additional, the method further comprises a rotation. An embodiment can automatically perform raster alignment, in other words, any input coordinate position is rounded or floored or ceiled to the nearest intersection of two raster lines, while any output coordinate position is rounded or floored or ceiled to the nearest intersection of two grid lines.

Figure 4:
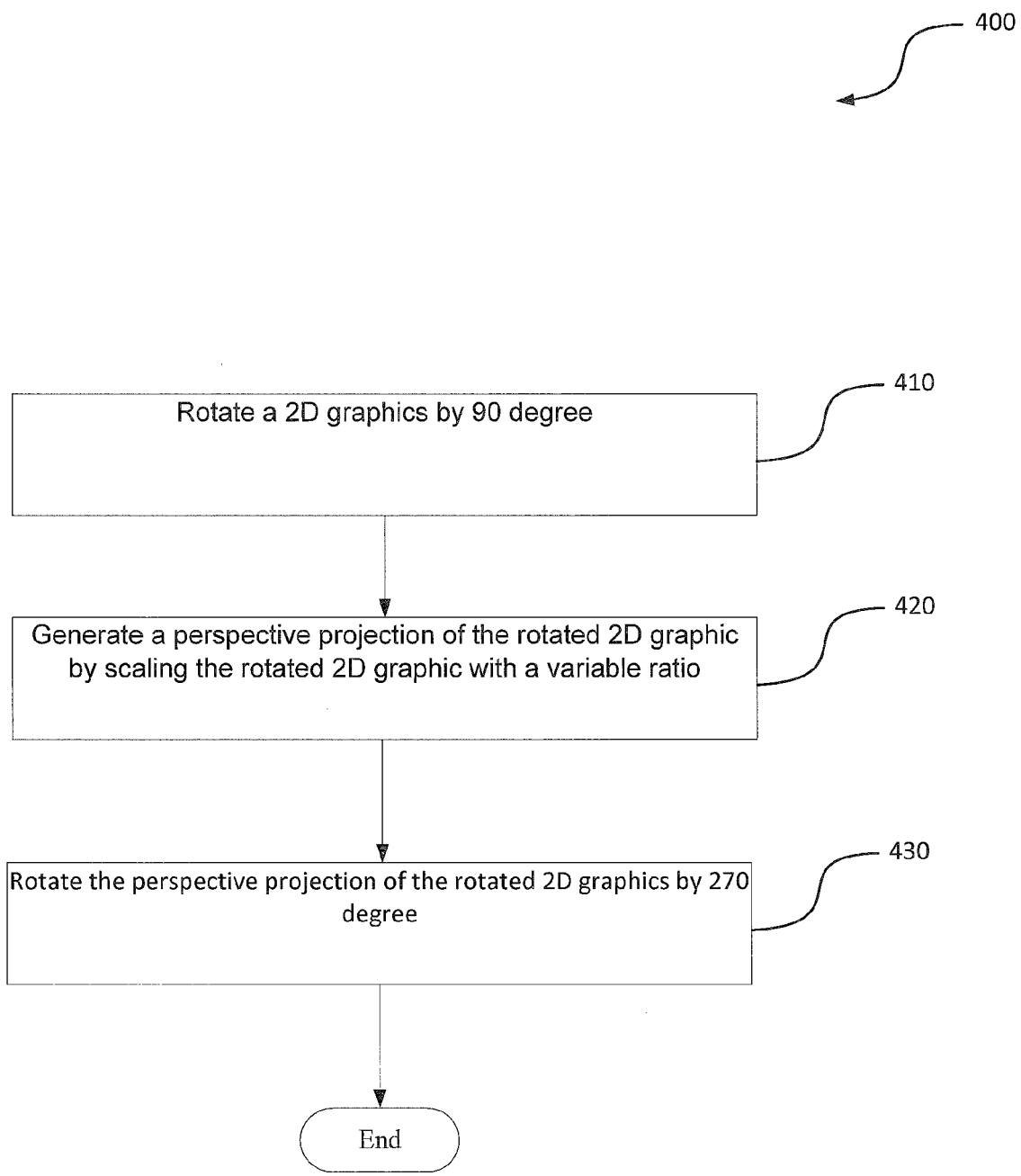
FIG. 4 is a flow chart illustrating another embodiment of a method of generating 3D graphics from 2D graphics.

FIG. 4 is a flow chart illustrating another embodiment of a method of generating 3D graphics from 2D graphics.

The method 400 comprises rotating (in block 410) a 2D graphics by 90 degrees; generating (in block 420) a perspective projection of the rotated 2D graphics by scaling the rotated 2D graphics with a variable ratio, and rotating (in block 430) the perspective projection of the rotated 2D graphics by 270 degrees. In block 410, if the 90 degrees that the 2D graphics is rotated is counter clockwise, the 270 degrees that the perspective projection of the rotated 2D should be counter clockwise in block 430. Alternatively if the 90 degrees that the 2D graphics is rotated is clockwise, the 270 degrees that the perspective projection of the rotated 2D rotates should be clockwise in block 430.

Note in the above embodiment, the block 420 for scaling the graphics with variable ratio uses scaling ratios that increase line by line from top to bottom, therefore the scaled graphics may have a smaller upper base and a larger bottom base. In the followings, unless explicitly specify otherwise, the method used for scaling the graphics with variable ratio uses scaling ratios that increase line by line from top to bottom. Alternatively, if the method used for scaling the graphics with variable ratio uses scaling ratios that decrease line by line from top to bottom, the scaled graphics may have a larger upper base and a smaller bottom base. With this embodiment, if the 2D graphics is first rotated clockwise by 90 degrees and then rotated clockwise by 270 degrees, the generated 3D graphics appears smaller on the left side and larger on the right side, which means the left part of the 3D graphics appears to be more distant than the right side of the 3D graphics. Alternatively, if the 2D graphics is first rotated counter clockwise by 90 degrees and then rotated counter clockwise by 270 degrees, the generated 3D graphics appears larger on the left side and smaller on the right side, which means the left part of the 3D graphics appears to be more nearer than the right side of the 3D graphics.

Figure 5:
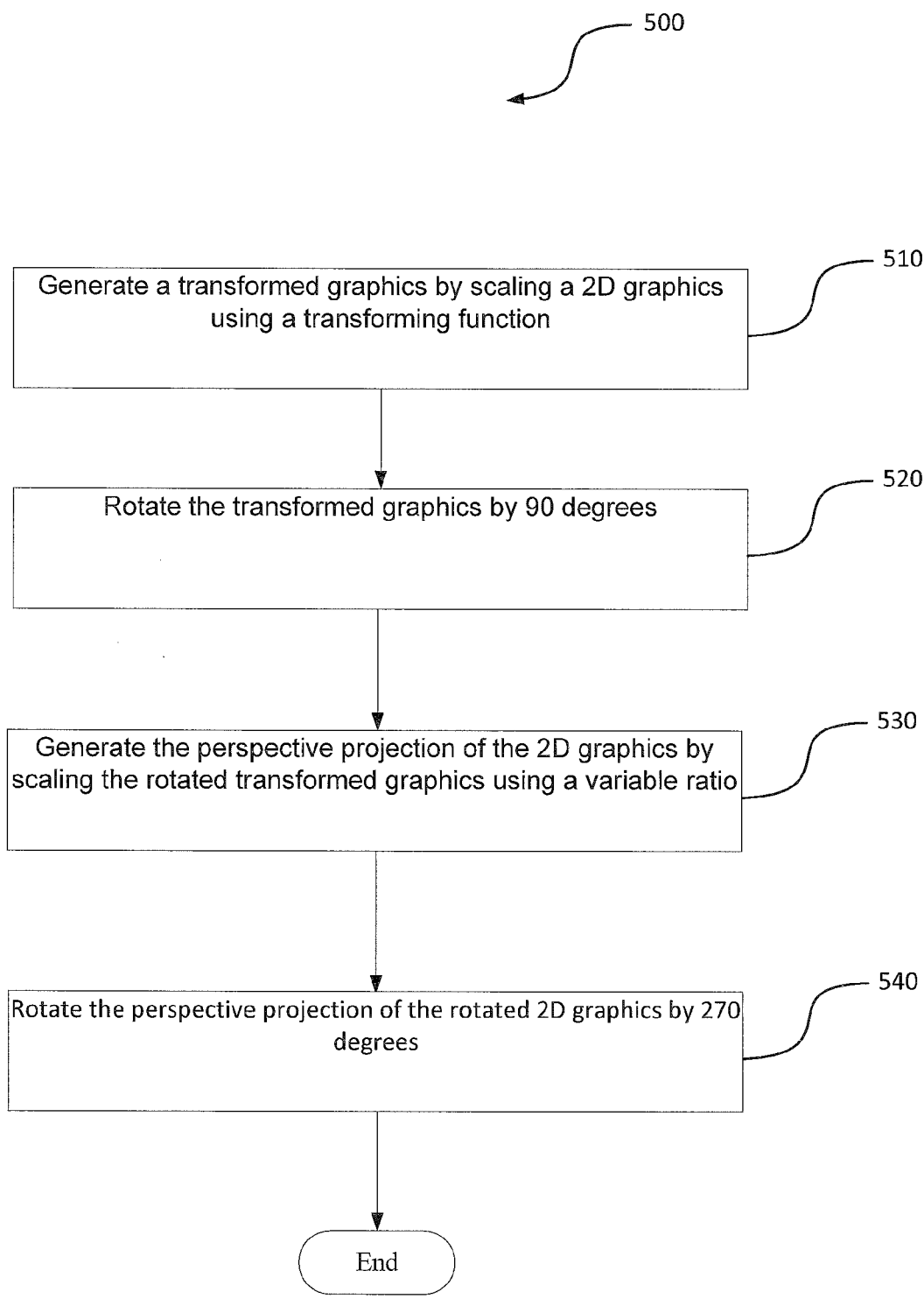
FIG. 5 is a flow chart illustrating another embodiment of a method of generating 3D graphics from 2D graphics.

FIG. 5 is a flow chart illustrating another embodiment of a method of generating 3D graphics from 2D graphics. The method 500 comprises generating (in block 510) a transformed graphics by scaling a 2D graphics using a transforming function; rotating (in block 520) the transformed graphics by 90 degrees; generating (in block 530) the perspective projection of the 2D graphics by scaling the rotated transformed graphics using a variable ratio; and rotating (in block 540) the perspective projection of the rotated 2D graphics by 270 degrees. The details of the transforming function in block 510 will be described in the following.

More specifically, generating the transformed graphics by scaling a 2D graphics using a transforming function in block 510 comprises convolutional filtering the 2D graphics with an interpolation filter, such that a point $x_p$ in the transformed graphics is generated from the points $x_0$ in the 2D graphics with a following equation $x_0 = b \times x_p + C$.

Figure 6:
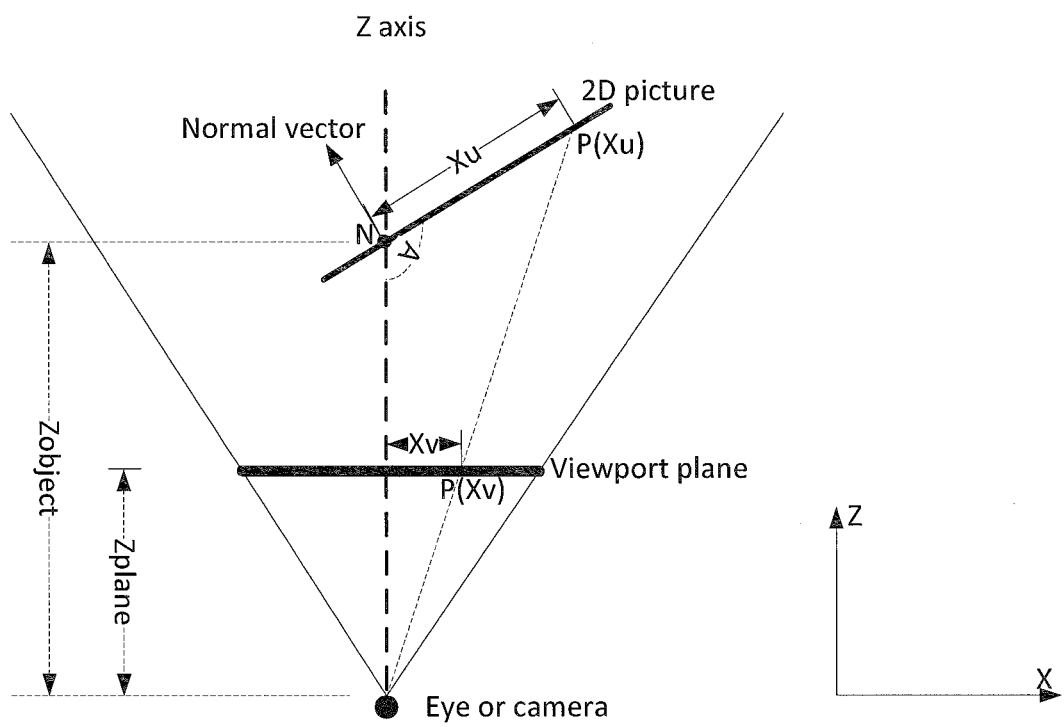
FIG. 6 is a diagram illustrating a principle for projection of 2D graphics by a non-linear ratio scaling operation. $P(x_u)$ is a point in the modeling coordinate.

FIG. 6 is a diagram illustrating a principle for projection of 2D graphics by a non-linear ratio scaling operation. $P(x_u)$ is a point in the modeling coordinate. $P(x_v)$ is a point in the viewport plane, which is a projection of the point $P(x_u)$ in the viewport plane. Suppose that the normal of the 2D graphics is in the X-Z plane as shown in FIG. 6. $X_u$ is a distance of the point $P(x_u)$ to a point N in the z axis in the modeling coordinate, and $x_v$ is a distance of the point $P(x_v)$ to the z axis in the viewport coordinate. The mapping between $P(x_u)$ and $P(x_v)$ can be obtained by using 3D graphics mapping. Note if the angle A between distance $X_u$ and the z axis shown in FIG. 6 is 90 degrees, in other words, the normal vector of distance $x_u$ overlaps the Z axis, or in other words, the 2D graphics is parallel to the viewport plane, there is a linear mapping relationship between $x_u$ and $x_v$. When the angle A does not equal 90 degrees, there is a non-linear mapping relationship between $x_u$ and $x_v$.

Figure 7:
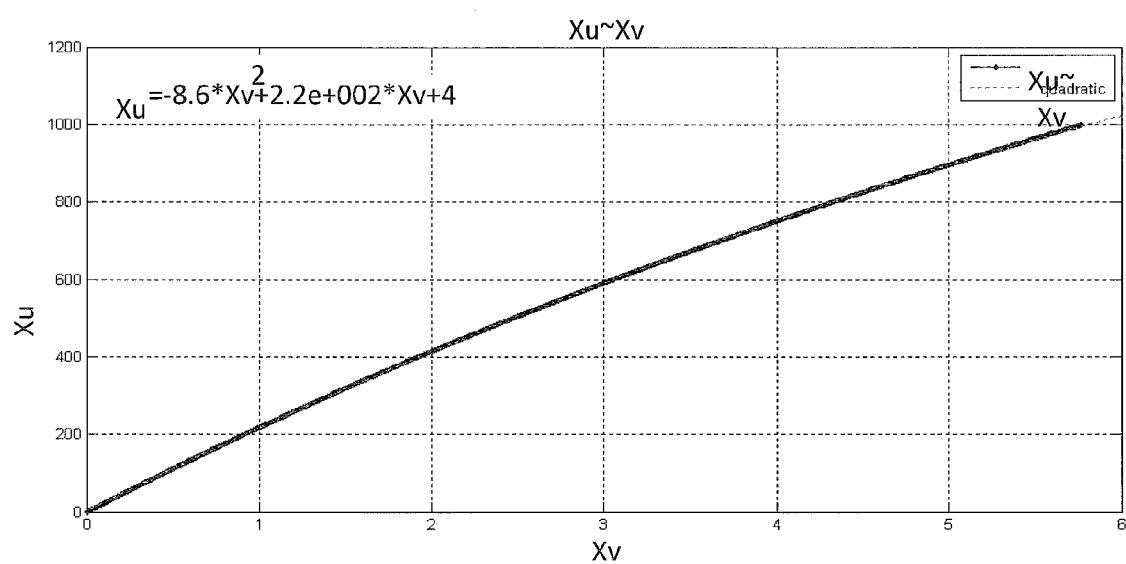
FIG. 7 is a diagram illustrating the mapping relationship between $x_u$ and $x_v$.

FIG. 7 is a diagram illustrating the mapping relationship between $x_u$ and $x_v$. The $x_u$ and $x_v$ in FIG. 7 are the same as $x_u$ and $x_v$ shown in FIG. 6, which all represent distances. As shown in FIG. 7, the mapping relationship between $x_u$ and $x_v$ appears to be a curve. The above curve can be represented by $x_u = a \times x_v^2 + b \times x_v + C$.

Referring to the equation $x_u = a \times x_v^2 + b \times x_v + C$ in FIG. 7, when a equals 0, the mapping relationship between $x_u$ and $x_v$ is linear. Graphics resampling can be used to calculate $x_v$ from $x_u$, and the resampling factor is b. In this embodiment, the graphics is resampled only in x direction, and the resampling operation is: suppose the input graphics is A(m, n), wherein m, n is a raster scan point of the digitalized graphics in the modeling coordinate, the width of the input 2D graphics (in x direction) is inWidth, and the height of the input 2D graphics (in y direction) is inHeight.

The mapping graphics of the 2D graphics A(m, n) in the viewport plane is B(i, j), wherein i, j represents raster point in the viewport plane. The width of the output graphics (in x direction) is outWidth, and the height of the output graphics (in y direction) is outHeight.

The computation can be represented as
When a equals 0,

```
xu=b*xv+C
    For j=1:N:outHeight
    {
        For k=1:N
        {
            xi(k) = Xi0;
        }
        For i=1:outWidth
        {
            For k=1:N
            {
                B(i,j+k-1) = AX(xi(k),j+k-1);
                xi(k) = xi(k)+b;
            }
        }
    }
```

Wherein N is a power of 2, such as 4, 8, 16.

Xi0 is an initial phase of the input graphics, i.e., the boundary of the graphics A(m, n) in the x direction.

AX(x, y) is a plane graphics corresponding to the A(m, n). A (m, n) comprises digitalized points, which are discrete. The value of AX(x, y) can be generated by interpolating values into A(m, n). In this embodiment, the interpolation is carried out in the X direction. AX(x, y) can be obtained from the following equation:

$$AX(xi(k), y) = \sum_u F(u, y) \times A(u, y)$$

When F(u,y) does not vary with the change of sampling point or output lines, F(u, y) equals F(u), which means F(u,y) does not change in the y direction. F(u) can be an interpolation filter. To be more specific, F(u) can be an interpolation filter with finite length, therefore u is an integer within a scope related to the length of the filter. The interpolation filter can be a cubic filter, a linear interpolation filter, a Sinc filter, or any kinds of filter that can carry out interpolation operation.

Alternatively, the interpolation filter is a variable filter dependent on a horizontal location of the pixel. In other words, the interpolation filter varies with the increase of interpolated point. The advantage of using the variable interpolation filter in that: since the resampling frequency for resampling in block 510 shown in FIG. 5 is variable, in other words, points with different horizontal coordinate within the 2D graphics are scaled with different scaling ratio, using variable interpolation filter for different resampling frequency improves frequency response for resampling, and improves the quality of output graphics.

Figure 8:
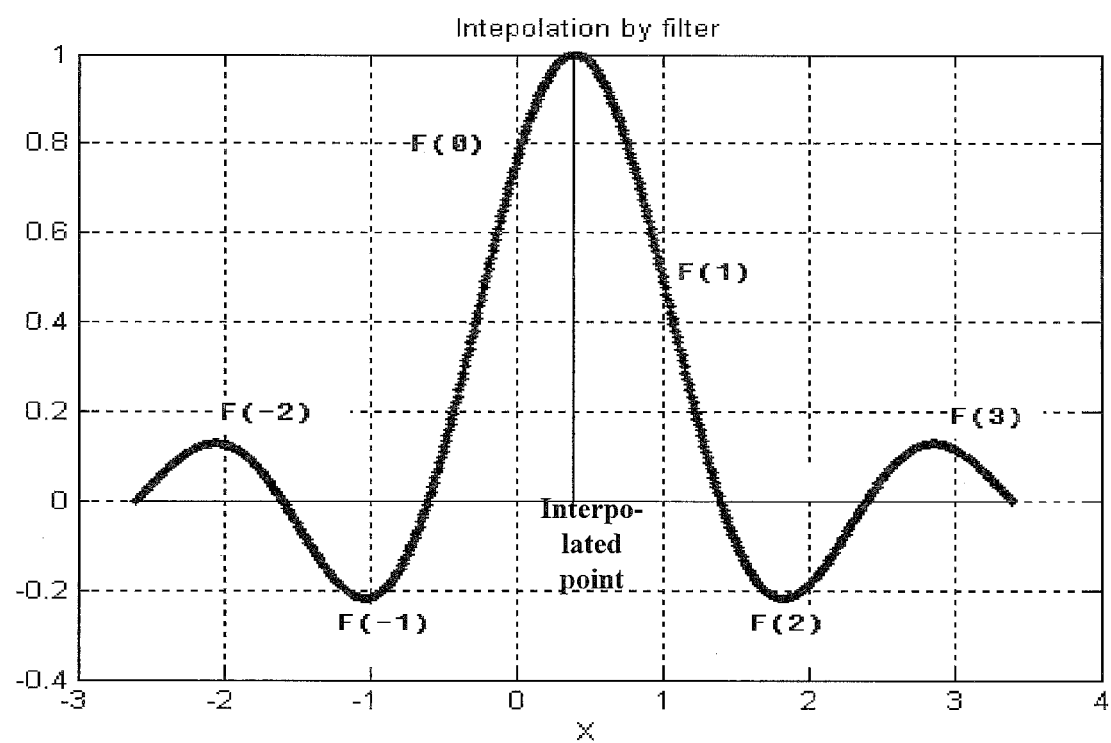
FIG. 8 is a chart showing the continuous filter F(x) and the discrete digital filter F(u).

As u is an integer, the continuous filter F(x) and the discrete digital filter F(u) are shown in FIG. 8. FIG. 8 is a chart showing continuous filter F(x) and the discrete digital filter F(u). F(−2), F(−1), F(0), F(1), F(2) and F(3) are the discrete points in F(u).

When a does not equal 0, that is $x_u = a \times x_v^2 + b \times x_v + c$, b1 can be defined as $b1 = (a \times x_v + b)$, therefore $x_u$ can be represented as $x_u = b1 \times x_v + c$.

When resampling is used to compute the output points, the resampling coefficient b1 is linear to $x_v$. The computation can be represented as:

```
For j=1:N:outHeight
{
    For k=1:N
    {
        xi(k) = Xi0;
    }
    b1=b;
    For i=1:outWidth
    {
        For k=1:N
        {
            B(i,j+k-1) = AX(xi(k),j+k-1);
            xi(k) = xi(k)+b1;
        }
        b1 = b1+2*a;
    }
}
```

Wherein N is a power of 2, such as 4, 8, 16.

Xi0 is an initial phase of the input graphics, i.e., the boundary of the graphics A(m, n) in the x direction.

AX(x, y) is a plane graphics corresponding to the A(m, n). A (m, n) comprises digitalized points, which are discrete. The value of AX(x, y) can be generated by interpolating values into A(m, n). In this embodiment, the interpolation is carried out in the X direction. AX(x, y) can be obtained from the following equation:

$$AX(xi(k), y) = \sum_u F(u, y) \times A(u, y)$$

When F(u,y) does not vary with the change of sampling point or output lines, F(u, y) equals F(u), which means F(u,y) does not change in the y direction. F(u) can be an interpolation filter. To be more specific, F(u) can be an interpolation filter with finite length, therefore u is an integer within a scope related to the length of the filter. The interpolation filter can be a cubic filter, a linear interpolation filter, a Sinc filter, or any kinds of filter that can carry out interpolation operation.

Referring back to FIG. 7, in which the curve is fitted to $x_u = a \times x_v^2 + b \times x_v + C$. Alternatively, the curve can be approximated by a N-order polynomial, which is more accurate. In this scenario, $x_u$ can be represented as $$x_u = \sum_{k=0}^{n} c(k) \times x_v^k,$$

wherein c(k) is a polynomial coefficient.

Let delta $$(x_u) = \sum_{k=1}^{n} k \times c(k) \times x_v^{k-1},$$

the algorithm for resampling can be represented as follows

```
For j=1:N:outHeight
{
    For k=1:N
    {
        xi(k) = Xi0;
    }
    b1=c(0);
    For i=1:outWidth
    {
        For k=1:N
        {
            B(i,j+k-1) = AX(xi(k),j+k-1);
            xi(k) = xi(k)+b1;
        }
        b1=delta(xi(k));
    }
}
```

Referring back to FIG. 5, rotating the transformed graphics by 90 degrees counter clockwise in block 520 shown in FIG. 5 comprises dividing the transformed or scaled 2D graphics into blocks. The size of each block can be N×N, and one block can be represented as a matrix U(i, j), wherein 0<i<(N−1); 0<j<(N−1). Pixels within each block are rotated by 90 degrees, and then the rotated pixels are outputted to designated addresses following a certain order.

The algorithm for rotating a size N×N block by 90 degrees can be expressed as: given a matrix U(i, j), wherein 0<i<(N−1); 0<j<(N−1), i corresponds to a coordinate in X axis, and j corresponds to a coordinate in y axis. Mirroring the matrix U (i,j) about a central vertical line of the matrix U (i,j), which can be represented as U'(i,j)=U(N−i−1,j); and then transposing the mirrored matrix U'(i,j), which can be represented as V(i,j)=U'(j,i). Further, those having ordinary skill in the art can understand that other method, such as flipping horizontal, flipping vertical, mirror can also be used to implement the rotation.

Figure 9:
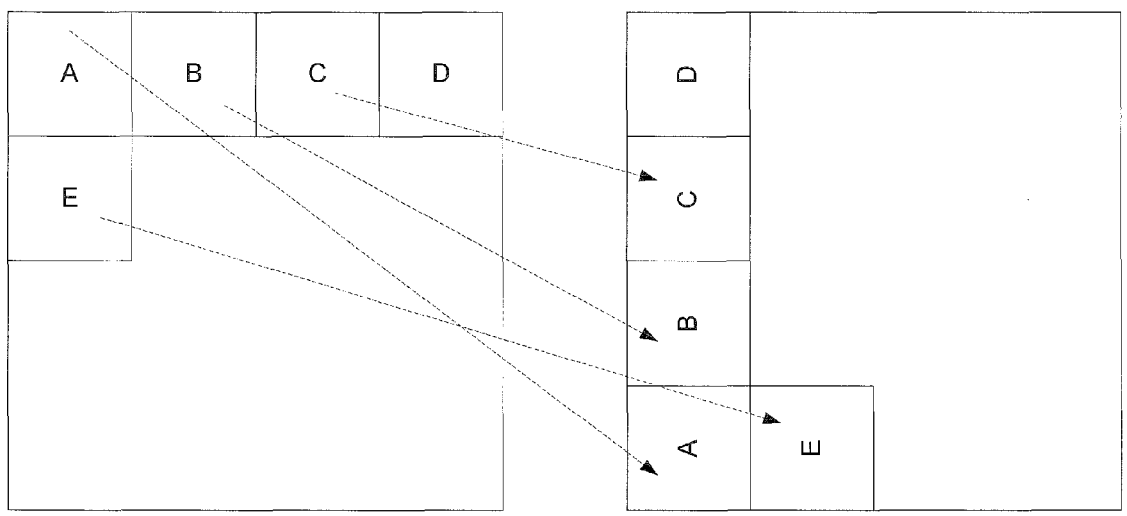
FIG. 9 is a diagram illustrating an embodiment of the sequence for outputting the rotated blocks.

FIG. 9 is a diagram illustrating an embodiment of the sequence for outputting the rotated blocks. FIG. 9 shows five blocks A, B, C, D and E. Note that the five blocks are for illustrative purpose only and an actual graphics may include blocks more than or less than five. Further, those having ordinary skill in the art should understand that some blocks within the FIG. 9 may be partial, instead of N*N, as can be clearly seen from FIG. 2B, for example, the lowermost blocks. Suppose each block has a row index of u and a column index of v, which can be represented as (u,v). The total size of the 2D graphics is for example M×M, which means the 2D graphics can be represented as an array of M rows and M columns of blocks. An input block within the 2D graphics with a location of (u, v) should be outputted to the location (M−v+1,u). As shown in FIG. 9, the input block A has a location of (1,1) and is outputted at a location (4,1). The input block E has a location of (2,1) and is outputted at a location (4,2). For example, block A is outputted first to (4,1), and then block B is outputted to (3,1), then block C is outputted to (2,1), then block D is outputted to (1,1), and then block E is outputted to (4, 2).

Referring back to FIG. 5, rotating the transformed graphics by 270 degrees counter clockwise in block 540 shown in FIG. 5 comprises dividing the transformed or scaled 2D graphics into blocks. The size of each block can be N×N, and one block can be represented as a matrix U(i, j), wherein 0<i<(N−1); 0<j<(N−1). Pixels within each block are rotated by 270 degrees, and then the rotated pixels are outputted to designated addresses following a certain order.

The algorithm for rotating a size-N*N block by 270 degrees can be represented as: given a matrix U(i, j), wherein 0<i<(N−1); 0<j<(N−1), i corresponds to a coordinate in X axis, and j corresponds to a coordinate in y axis, mirroring the matrix U (i,j) about a central horizontal line of the matrix U (i,j), which can be represented as U'(i,j)=U(i, N−j−1); and then transposing the mirrored matrix U'(i,j), which can be represented as V(i,j)=U'(j,i).

Figure 10:
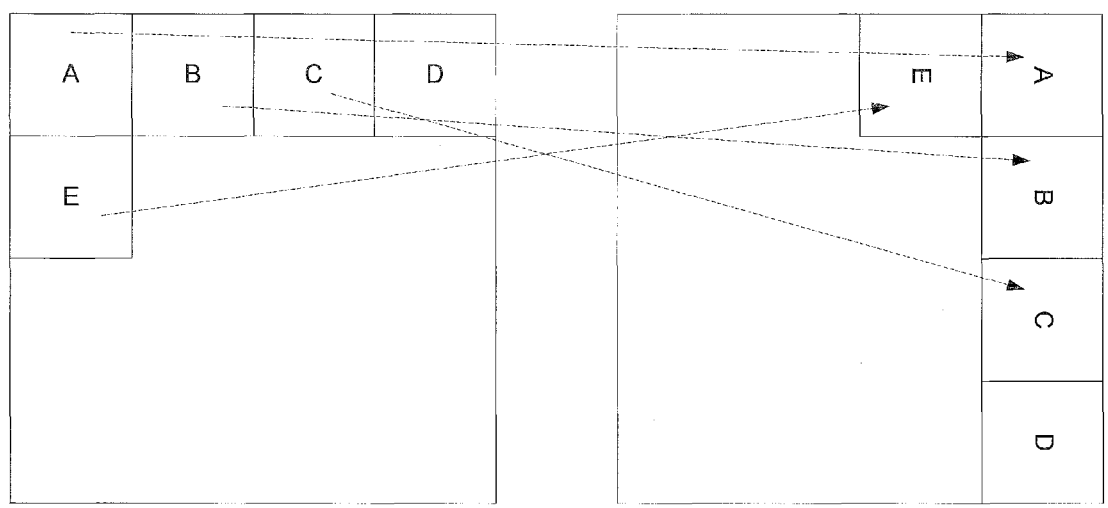
FIG. 10 is a diagram illustrating another embodiment of the sequence for outputting the rotated blocks.

FIG. 10 is a diagram illustrating an embodiment of the sequence for outputting the rotated blocks. FIG. 10 shows five blocks A, B, C, D and E. Note that the five blocks are for illustrative purpose only and an actual graphics may include blocks more than or less than five. Suppose each block has a row index of u and a column index of v, which can be represented as (u,v). The total size of the 2D graphics is for example M×M, which means the 2D graphics can be represented as an array of M rows and M columns of blocks. An input block within the 2D graphics with a location of (u, v) should be outputted to the location (v, M−u+1). As shown in FIG. 10, the input block A has a location of (1,1) and is outputted at a location (1,4). The input block E has a location of (2,1) and is outputted at a location (1,3). For example, block A is outputted first to (1,4), and then block B is outputted to (2,4), then block C is outputted to (3,4), then block D is outputted to (4,4), and then block E is outputted to (1, 3).

Referring back to FIG. 5, alternatively, the blocks 510, 520, 530 and 540 can be permuted. For example, first in block 510 a 2D graphics is transformed using a transforming function, then the transformed graphics is rotated by 270 degrees, then follows block 530 the rotated graphics is scaled using a variable ratio (supposing using scaling ratios that increase line by line from top to bottom), then follows that the scaled graphics is rotated by 90 degrees. With the above operation, the output graphics appear to be larger on the left part of the graphics and smaller on the right part of the graphics.

Figure 11:
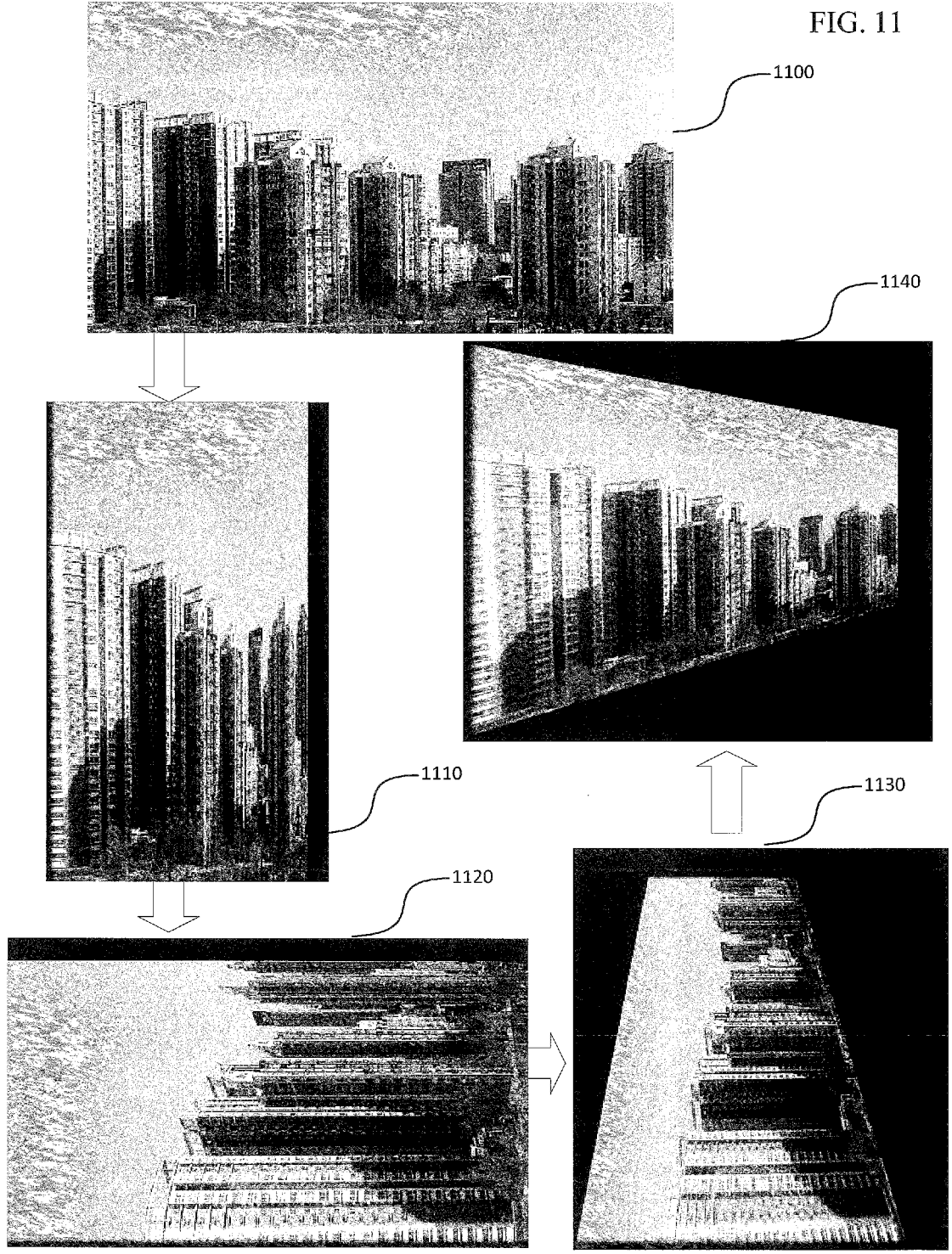
FIG. 11 is a diagram illustrating a graphic representation after treatment by each block of FIG. 5.

FIG. 11 is a diagram illustrating a graphic representation after treatment by each block of FIG. 5. In FIG. 11, block 1100 represents obtaining a two-dimensional (2D) graphic.

Block 1110 represents the graphics after being treated by block 510 of using a transformation function. Block 1120 represents the graphics after treated by block 520 of being rotated by 90 degrees counterclockwise. Block 1130 represents the graphics after treated by block 530 of being scaled using a variable ratio. Block 1140 represents the graphics after treated by block 540 of being rotated by 270 degrees counterclockwise. The graphics shown in block 1140 is a perspective projection of the original 2D graphics shown in block 1100.

Alternatively, unlike the order shown in FIG. 5, the 2D graphics can be treated with different order. For example, a 2D graphics is first rotated 90 degrees, then follows block 510 the rotated graphics is transformed using a transforming function, then the transformed graphics is rotated by 270 degrees, then follows block 530 the rotated graphics is scaled using scaling ratios that decreases line by line from top to bottom. With the above operation, the output graphics appear to be larger on the upper part of the graphics and smaller on the lower part of the graphics.

Alternatively, a 2D graphics is first rotated 270 degrees, then follows block 510 the rotated graphics is transformed using a transforming function, then the transformed graphics is rotated by 90 degrees, then follows block 530 the rotated graphics is scaled using scaling ratios that increase line by line from top to bottom. With the above operation, the output graphics appear to be larger on the lower part of the graphics and smaller on the upper part of the graphics.

Figure 12:
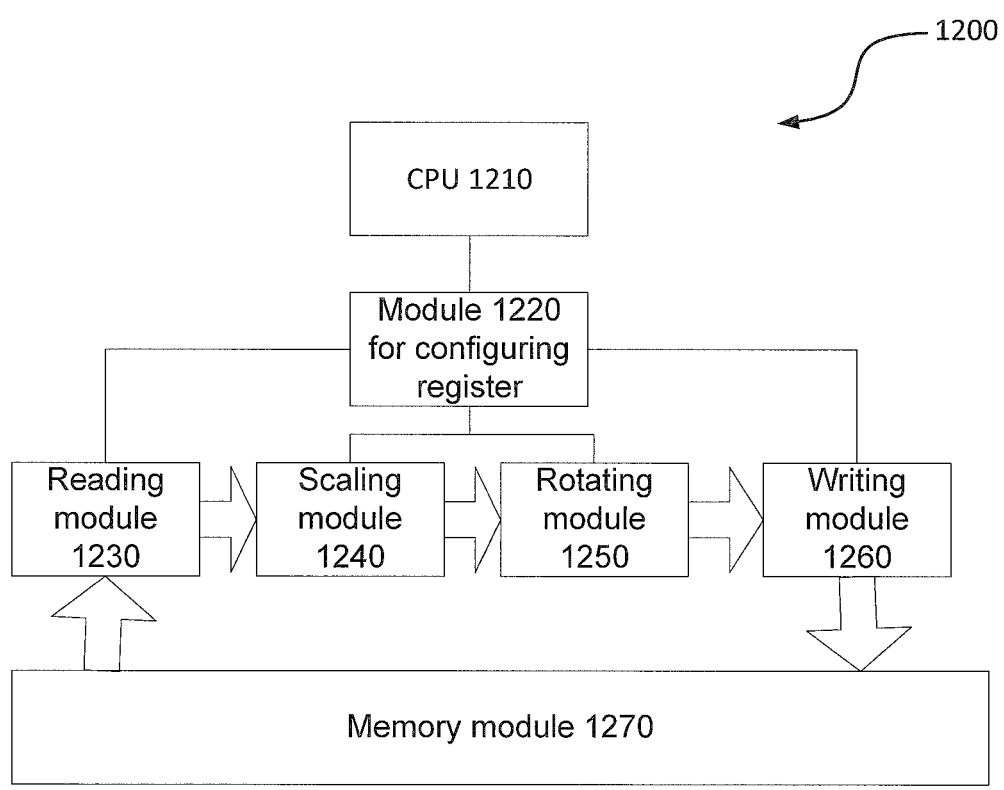
FIG. 12 is a diagram illustrating an embodiment of a hardware implementation of the 2D graphics processing device.

FIG. 12 is a diagram illustrating an embodiment of a hardware implementation of the 2D graphics processing device.

The device 1200 of processing 2D graphics comprises a reading module 1230 configured to read a two-dimensional (2D) graphics; and a scaling module 1240 configured to generate a perspective projection of the 2D graphics by scaling the 2D graphics with a variable ratio. The scaling module 1240 further interpolates the graphics with a filter, such that a point $x_p$ in the perspective projection is generated from a point $x_0$ in the 2D graphics with a following equation $x_0=1/R(j)*x_p+Ph(j)$, wherein j represents a line index of the point $x_0$, $1/R(j)$ represents a scaling factor of a length in the 2D graphics versus a length in the perspective projection, and $Ph(j)$ represents a phase shift. The device 1200 further comprises a CPU 1210, and a module 1220 for configuring register. The module 1220 for configuring register controls parameters for modules 1230, 1240, 1250 and 1260, for example, where is a start point for current round calculation, where is the end point, or how large is the initial ratio, or the address for data storage.

Alternatively, $Ph(j)$ compensates for a phase offset in a modeling coordinate where the point $x_0$ is located.

Alternatively, $Ph(j)=-PD(j)/R(j)$, $PD(j)=P(j)-PZ(j)$, $PZ(j)=Round(P(j))$, $R(j)$ equals $R0+j*(R1-R0)/Height$, $R_0=A'B'/AB$, $R_1=C'D'/CD$, wherein AB and CD represent the lengths in the 2D graphics, AB is the upmost line of the 2D graphics, and CD is the lowermost line of the 2D graphics, and A'B' and C'D' represent the lengths that AB and CD respectively project in the perspective projection, Height represents the height of the 2D graphics, $P(j)$ represents a start location of $x_p$ in line j.

Alternatively, the scaling module 1240 is further configured to assign a pixel value to a point $x_p$ when the point $x_p$ is beyond a boundary of the perspective projection.

Alternatively, the device 1200 further comprises a rotating module 1250 configured to rotate the 2D graphics by 90 degrees; and the scaling module 1240 is further configured to generate a perspective projection of the rotated 2D graphics by scaling the rotated 2D graphics with a variable ratio. The rotating module 1240 is further configured to rotate the perspective projection of the rotated 2D graphics by 270 degrees.

Alternatively, the scaling module 1240 further generates a transformed graphics by scaling a 2D graphics using a transforming function. The rotating module 1250 further rotates the transformed graphics by 90 degrees. The scaling module 1240 further generates the perspective projection of the rotated 2D graphics by scaling the rotated transformed graphics using a variable ratio function; and the rotating module is further configured to rotate the perspective projection of the 2D graphics by 270 degrees.

Alternatively, the scaling module 1240 further comprises an interpolation filter configured to generate the transformed graphics by scaling a 2D graphics using a transforming function that convolutionally filter the 2D graphics, such that a point $x_p$ in the transformed graphics is generated from the points $x_0$ in the 2D graphics with a following equation $x_0=a\times x_p^2+b\times x_p+C$.

Alternatively, the interpolation filter is a variable filter dependent on a horizontal location of the pixel.

Alternatively, the scaling module 1240 further comprises an interpolation filter configured to convolutionally filter the 2D graphics, such that pixels $x_p$ in the transformed graphics and the pixels $x_0$ in the 2D graphics satisfy a following equation $x_0=b\times x_p+C$.

Alternatively, the scaling module 1240 further comprises an interpolation filter configured to convolutionally filter the 2D graphics with an interpolation filter, such that pixels $x_p$ in the transformed graphics and the pixels $x_0$ in the 2D graphics satisfy a following equation $$x_0 = \sum_{k=0}^{n} c(k) \times x_p^k.$$

Alternatively, the rotating module 1250 further divides the 2D graphics into a plurality of blocks; mirror each block about a central vertical line of the block; transpose the mirrored block; and outputting the rotated 2D graphics by outputting the plurality of transposed blocks by following a predetermined sequence in a unit of blocks.

Alternatively, the scaling module 1240 further generates a transformed graphics by scaling a 2D graphics using a transforming function; the rotating module 1250 further rotate the transformed graphics by 270 degrees; the scaling module 1240 further scales the rotated transformed graphics using a variable ratio function; and the rotating module 1250 further rotates the perspective projection of the 2D graphics by 90 degrees.

During operation, the CPU 1210 configures graphics access parameters for the reading module 1230, such as address, row number and width. The CPU 1210 further configures the scaling module 1240 to work under a transforming mode, and configures the corresponding transform parameter as discussed in block 510 with reference to FIG. 5. The CPU 1210 further configures the rotating module 1250 to work under 90-degree rotation mode. The CPU 1210 further configures output sequences for addresses under the 90-degree rotation mode for the writing module 1260. The CPU 1210 further initiates the scaling module 1240 and the rotation module 1250 and stores the processed data in the memory module 1270 The CPU 1210 configures graphics access parameters for the reading module 1230, such as address, row number and width. The CPU 1210 further configures the scaling module 1240 to work under a scaling with a variable ratio mode, and configures the corresponding scale parameter as discussed in block 530 with reference to FIG. 5. The CPU 1210 further configures the rotating module 1250 to work under 270-degree rotation mode. The CPU 1210 further configures output sequences for addresses in the 270-degree rotation mode for the writing module 1260. The CPU 1210 further initiates the scaling module 1240 and the rotation module 1250 and stores the processed data in the memory module 1270. Further, CPU 1210 can configure the rotation module 1250 to rotate 180 or 270 degrees in addition to 90 degrees.

Figure 13:
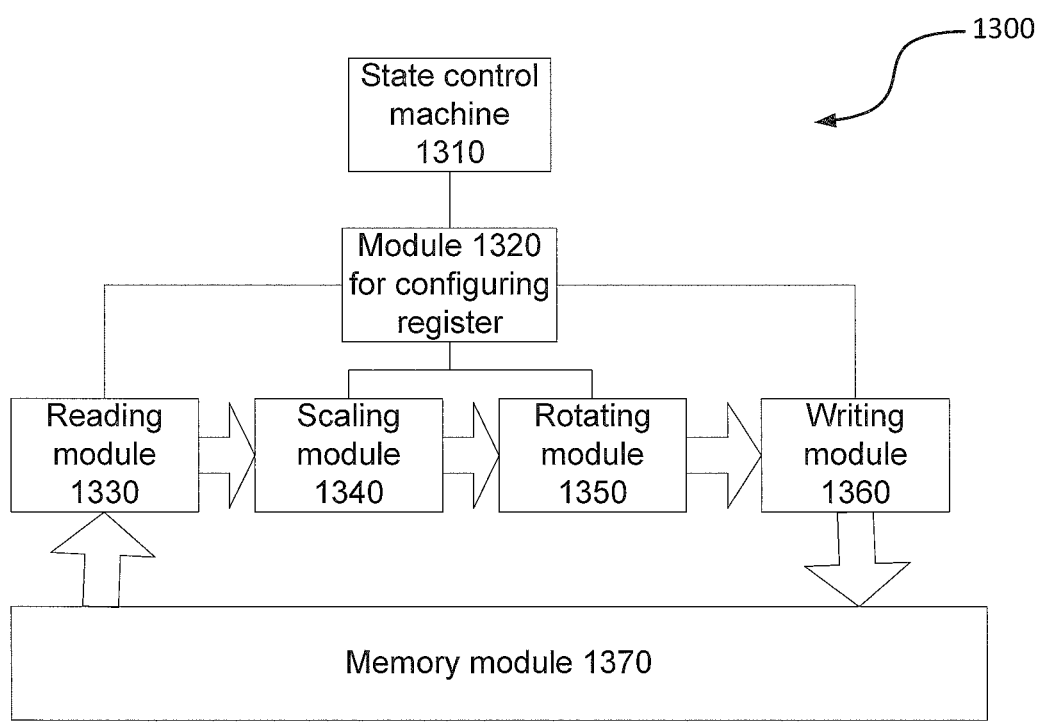
FIG. 13 is a diagram illustrating an embodiment of a hardware state machine implementation of the 2D graphics processing device.

The embodiment has the following advantages: automatic raster alignment, which improves display quality. As shown in FIGS. 12 and 13, for hardware process, only a scaling module and a rotating module are needed, which is easy to implement. The graphics data are read-in in sequence which has a high reading efficiency, and outputted blocks by blocks which has high output efficiency. Further the convolutional filter in the scaling or transforming module reduces or eliminates aliasing effect.

FIG. 13 is a diagram illustrating an embodiment of a hardware state machine implementation of the 2D graphics processing device 1300.

The device 1300 includes one or more state control machine 1310 and a memory module 1370. The state control machine 1310 controls the overall operation of the device 1300. In some embodiments, the state control machine 1310 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory module 1370 is or includes the main memory of device 1300. The memory module 1370 represents any form of random access memory (RAM), read-only memory (ROM), flash memory, or the like, or a combination of such devices. In use, the memory module 1370 may contain, among other things, software or firmware code for use in implementing at least some of the embodiments of the invention introduced herein. The reading module 1330, the scaling module 1340, the rotating module 1350 and the writing module 1360 resemble the reading module 1230, the scaling module 1240, the rotating module 1250 shown in FIG. 12.

Figure 14:
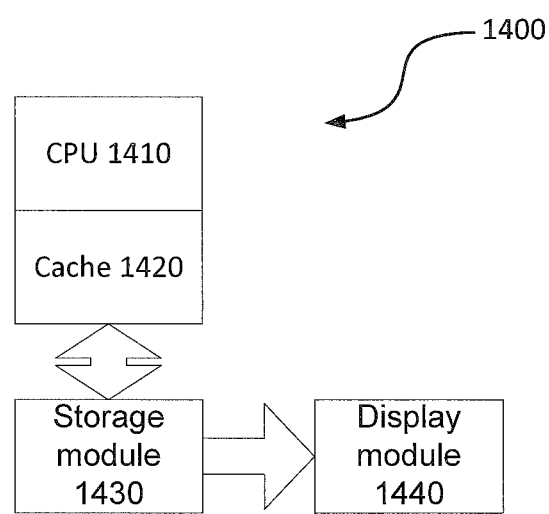
FIG. 14 is a diagram illustrating an embodiment of a software implementation of the 2D graphics processing device.

FIG. 14 is a diagram illustrating an embodiment of a software implementation of the 2D graphics processing device. The device 1400 comprises a CPU 1410, a cache 1420, a storage module 1430 and a display module 1440. Note that the CPU 1410 incorporates all the function of the CPU 1210, the reading module 1230, the scaling module 1240, the rotating module 1250 and the writing module 1260 shown in FIG. 12. Therefore details for the operation of CPU 1410 are omitted.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

From the foregoing, it will be appreciated that specific embodiments of the invention have been described herein for purposes of illustration, but that various modifications may be made without deviating from the scope of the invention. Accordingly, the invention is not limited except as by the appended claims.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Even if certain features are recited in different dependent claims, the present invention also relates to an embodiment comprising these features in common. Any reference signs in the claims should not be construed as limiting the scope.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. Moreover, features of one embodiment may be incorporated into other embodiments, even where those features are not described together in a single embodiment within the present document. Accordingly, the invention is described by the appended claims.

We claim:

1. A method comprising:

retrieving, by a reading module, a 2D graphics from a first address of a memory module in sequence;

generating, by a scaling module, a perspective projection of the 2D graphics by scaling the 2D graphics with a variable ratio in one direction so as to generate an perspective effect, wherein the 2D graphics comprises a plurality of points $x_0$, wherein scaling the 2D graphics with the variable ratio comprises interpolating each point $x_0$ in the graphics with a filter, such that a point $x_p$ in the perspective projection is generated from the point $x_0$ in the 2D graphics with a following equation $x_0 = 1/R(j) * x_p + Ph(j)$, wherein j represents a line index of the point $x_0$, $1/R(j)$ represents a scaling factor of a length in the 2D graphics versus a length in the perspective projection, and $Ph(j)$ represents a phase shift;

for each point $x_0$ in the 2D graphics, repeating interpolating operation; and outputting, by a writing module, the generated perspective projection of the 2D graphic into a second address of the memory module, wherein the first address is different from the second address.

2. The method of claim 1, wherein Ph(j) compensates for a phase offset in a modeling coordinate where the point $x_0$ is located.

3. The method of claim 1, wherein Ph(j)=−PD(j)/R(j), PD(j)=P(j)−PZ(j), R(j) equals R0+j*(R1−R0)/Height, $R_0$=A'B'/AB, $R_1$=C'D'/CD, wherein AB and CD represent the lengths in the 2D graphics, AB is the upmost line of the 2D graphics, and CD is the lowermost line of the 2D graphics, and A'B' and C'D' represent the lengths that AB and CD respectively project in the perspective projection, Height represents a height of the 2D graphics, P(j) represents a start location of $x_p$ in line j, PZ(j) represents an integer approximation of P(j).

4. The method of claim 1 further comprising assigning, by the scaling module, a pixel value to a point $x_p$ when the point $x_p$ is beyond a boundary of the perspective projection.

5. The method of claim 1 wherein the filter is a variable filter dependent on a horizontal location of point within the 2D graphics.

6. The method of claim 1, wherein before generating the perspective projection of the 2D graphics by scaling the 2D graphics with the variable ratio, the method further comprises:
rotating, by a rotating module, the 2D graphics by 90 degrees;
wherein generating, by the scaling module, the perspective projection of the 2D graphics by scaling the 2D graphics with the variable ratio further comprises generating a perspective projection of the rotated 2D graphics by scaling the rotated 2D graphics with a variable ratio; and
the method further comprises rotating, by the rotating module, the perspective projection of the rotated 2D graphics by 270 degrees.

7. The method of claim 6, wherein rotating the 2D graphics by 90 degrees further comprises:
dividing the 2D graphics into a plurality of blocks;
mirroring each block about a central vertical line of the block;
transposing the mirrored block; and
outputting the rotated 2D graphics by outputting the plurality of transposed blocks by following a predetermined sequence in a unit of blocks.

8. The method of claim 1 further comprising:
generating, by the scaling module, a transformed graphics by scaling the 2D graphics using a transforming function;
rotating, by a rotating module, the transformed graphics by 90 degrees;
wherein generating the perspective projection of the 2D graphics by scaling the 2D graphics with the variable ratio also comprises scaling the rotated transformed graphics using a variable ratio; and
the method further comprises:
rotating, by the rotating module, the perspective projection of the rotated 2D graphics by 270 degrees.

9. The method of claim 8 wherein generating the transformed graphics by scaling the 2D graphics using the transforming function comprises:
convolutionally filtering the 2D graphics with an interpolation filter, such that a point $x_p$ in the transformed graphics is generated from the points $x_0$ in the 2D graphics with a following equation $x_0 = a \times x_p^2 + b \times x_p + C$.

10. The method of claim 8 wherein the interpolation filter is a variable filter dependent on a horizontal location of a point within the 2D graphics.

11. The method of claim 8 wherein generating the transformed graphics by scaling a 2D graphics using the transforming function comprises:
convolutionally filtering the 2D graphics with an interpolation filter, such that a point $x_p$ in the transformed graphics and the point $x_0$ in the 2D graphics satisfy a following equation $x_0 = b \times x_p + C$.

12. The method of claim 8 wherein generating the transformed graphics by scaling a 2D graphics using the transforming function comprises:
convolutionally filtering the 2D graphics with an interpolation filter, such that a point $x_p$ in the transformed graphics and the point $x_0$ in the 2D graphics satisfy a following equation $$x_0 = \sum_{k=0}^{n} c(k) \times x_p^k.$$

13. The method of claim 1 further comprising:
generating a transformed graphics by scaling a 2D graphics using a transforming function;
rotating, by a rotating module, the transformed graphics by 270 degrees;
wherein generating, by the scaling module, the perspective projection of the 2D graphics by scaling the 2D graphics with the variable ratio also comprises scaling the rotated transformed graphics using a variable ratio function; and
the method further comprises:
rotating, by the rotating module, the perspective projection of the 2D graphics by 90 degrees.

14. A device comprising:
a memory module connected to both a reading module and a writing module,
wherein the reading module is configured to read a 2D graphics in sequence, from a first address of the memory module;
a scaling module connected to the reading module and configured to generate a perspective projection of a 2D graphics by scaling the 2D graphics with a variable ratio, wherein the 2D graphics comprises a plurality of points $x_0$, the scaling module further comprises
a filter configured to interpolate each point $x_0$ in the graphics, such that a point $x_p$ in the perspective projection is generated from the point $x_0$ in the 2D graphics with a following equation $x_0 = 1/R(j) \ast x_p + Ph(j)$, wherein j represents a line index of the point $x_0$, 1/R(j) represents a scaling factor of a length in the 2D graphics versus a length in the perspective projection, and Ph(j) represents a phase shift;
for each point $x_0$ in the 2D graphics, the filter is further configured to repeat the interpolating operation; and
wherein the writing module is connected to the scaling module and configured to output the generated perspective projection of the 2D graphics into a second address of the memory module, wherein the first address is different from the second address.

15. The device of claim 14, wherein Ph(j) compensates for a phase offset in a modeling coordinate where the point $x_0$ is located.

16. The device of claim 14, wherein Ph(j)=−PD(j)/R(j), PD(j)=P(j)−PZ(j), R(j) equals R0+j*(R1−R0)/Height, $R_0=A'B'/AB$, $R_1=C'D'/CD$, wherein AB and CD represent the lengths in the 2D graphics, AB is the upmost line of the 2D graphics, and CD is the lowermost line of the 2D graphics, and A'B' and C'D' represent the lengths that AB and CD respectively project in the perspective projection, Height represents a height of the 2D graphics, P(j) represents a start location of $x_p$ in line j.

17. The device of claim 14 wherein the scaling module is further configured to assign a pixel value to a point $x_p$ when the point $x_p$ is beyond a boundary of the perspective projection.

18. The device of claim 14 wherein the filter is a variable filter dependent on a vertical location of the pixel.

19. The device of claim 14 further comprising:
a rotating module configured to rotate the 2D graphics by 90 degrees;
wherein the scaling module is further configured to generate a perspective projection of the rotated 2D graphics by scaling the 2D graphics with a variable ratio; and
the rotating module is further configured to rotate the perspective projection of the rotated 2D graphics by 270 degrees.

20. The device of claim 19 wherein the filter further comprises an interpolation filter configured to generate the transformed graphics by scaling a 2D graphics using the transforming function that convolutional filter the 2D graphics, such that a point $x_p$ in the transformed graphics is generated from the points $x_0$ in the 2D graphics with a following equation $x_0=a \times x_p^2+b \times x_p+C$.

21. The device of claim 19, wherein the rotating module is further configured to divide the 2D graphics into a plurality of blocks;
mirror each block about a central vertical line of the block;
transpose the mirrored block; and
outputting the rotated 2D graphics by outputting the plurality of transposed blocks by following a predetermined sequence in a unit of blocks.

22. The device of claim 14, wherein the scaling module is further configured to generate a transformed graphics by scaling a 2D graphics using a transforming function;
the rotating module is further configured to rotate the transformed graphics by 90 degrees;
the scaling module is further configured to generate the perspective projection of the rotated 2D graphics by scaling the rotated transformed graphics using a variable ratio function; and
the rotating module is further configured to rotate the perspective projection of the rotated 2D graphics by 270 degrees.

23. The device of claim 22 wherein the interpolation filter is a variable filter dependent on a horizontal location of the pixel.

24. The device of claim 22 wherein the filter further comprises an interpolation filter configured to convolutionally filter the 2D graphics, such that a point $x_p$ in the transformed graphics and the point $x_0$ in the 2D graphics satisfy a following equation $x_0=b \times x_p+C$.

25. The device of claim 22 wherein the filter further comprises an interpolation filter configured to convolutionally filter the 2D graphics such that point $x_p$ in the transformed graphics and the point $x_0$ in the 2D graphics satisfy a following equation $$x_0 = \sum_{k=0}^{n} c(k) \times x_p^k.$$

26. The device of claim 14 wherein the scaling module is further configured to
generate a transformed graphics by scaling a 2D graphics using a transforming function;
the device further comprises a rotating module configured to rotate the transformed graphics by 270 degrees;
the scaling module is further configured to scale the rotated transformed graphics using a variable ratio function; and
the rotating module is further configured to rotate the perspective projection of the 2D graphics by 90 degrees.

* * * * *